United States Patent
Fukushima et al.

(10) Patent No.: US 10,377,934 B2
(45) Date of Patent: Aug. 13, 2019

(54) AIR-CONDITIONER WORKING FLUID FOR ELECTRIC VEHICLE AND AIR-CONDITIONER WORKING FLUID COMPOSITION FOR ELECTRIC VEHICLE

(71) Applicants: AGC Inc., Chiyoda-ku (JP); DENSO CORPORATION, Kariya-shi (JP)

(72) Inventors: Masato Fukushima, Chiyoda-ku (JP); Satoshi Kawaguchi, Chiyoda-ku (JP); Katsuya Ueno, Chiyoda-ku (JP); Shin Nishida, Kariya (JP)

(73) Assignees: AGC Inc., Chiyoda-ku (JP); DENSO CORPORATION, Kariya-shi (JP)

(*) Notice: Subject to any disclaimer, the term of this patent is extended or adjusted under 35 U.S.C. 154(b) by 0 days.

(21) Appl. No.: 15/671,724

(22) Filed: Aug. 8, 2017

(65) Prior Publication Data

US 2017/0335159 A1    Nov. 23, 2017

Related U.S. Application Data

(63) Continuation of application No. PCT/JP2016/053390, filed on Feb. 4, 2016.

(30) Foreign Application Priority Data

Feb. 9, 2015  (JP) .................. 2015-023579

(51) Int. Cl.
*C09K 5/04* (2006.01)
*B60H 1/00* (2006.01)
*B60H 1/32* (2006.01)

(52) U.S. Cl.
CPC ......... *C09K 5/045* (2013.01); *B60H 1/00385* (2013.01); *B60H 1/3204* (2013.01);
(Continued)

(58) Field of Classification Search
CPC .............. C09K 5/045; C09K 2205/126; C09K 2205/22; C09K 5/041
See application file for complete search history.

(56) References Cited

U.S. PATENT DOCUMENTS

| 4,249,412 A | 2/1981 | Townsend, III |
| 5,440,919 A | 8/1995 | Cooper |

(Continued)

FOREIGN PATENT DOCUMENTS

| CA | 2 841 968 | 1/2013 |
| CA | 2 842 336 | 1/2013 |

(Continued)

OTHER PUBLICATIONS

International Search Report dated Apr. 12, 2016 in PCT/JP2016/053390 filed Feb. 4, 2016 (with English Translation).

(Continued)

*Primary Examiner* — John R Hardee
(74) *Attorney, Agent, or Firm* — Oblon, McClelland, Maier & Neustadt, L.L.P.

(57) ABSTRACT

There are provided an air-conditioner working fluid for electric vehicle providing sufficient cycle performance in practical use in an electric vehicle, in particular, sufficient cycle performance also in the heating time, while suppressing influence on global warming, and usable without greatly changing an air-conditioner device for a conventional working fluid, for example, HFC-134a or HFO-1234yf, and an air-conditioner working fluid composition for electric vehicle containing the same. The air-conditioner working fluid for electric vehicle contains trifluoroethylene, difluoromethane and 1,3,3,3-tetrafluoropropene, wherein a percentage of a total amount of trifluoroethylene, difluorometh- (Continued)

ane and 1,3,3,3-tetrafluoropropene with respect to a total amount of the working fluid is more than 90 mass % and 100 mass % or less.

10 Claims, 4 Drawing Sheets

(52) U.S. Cl.
CPC .......... *C09K 5/04* (2013.01); *C09K 2205/122* (2013.01); *C09K 2205/126* (2013.01); *C09K 2205/22* (2013.01)

(56) References Cited

U.S. PATENT DOCUMENTS

| | | | |
|---|---|---|---|
| 5,650,563 A | 7/1997 | Cooper et al. | |
| 9,828,537 B2 * | 11/2017 | Fukushima | C09K 5/045 |
| 10,013,827 B2 * | 7/2018 | Asano | G07C 9/00126 |
| 10,072,194 B2 * | 9/2018 | Tasaka | C09K 5/045 |
| 10,131,827 B2 * | 11/2018 | Fukushima | C09K 5/044 |
| 2003/0055256 A1 | 3/2003 | Niddam et al. | |
| 2005/0145822 A1 | 7/2005 | Drigotas et al. | |
| 2005/0151111 A1 | 7/2005 | Minor et al. | |
| 2005/0151113 A1 | 7/2005 | Minor et al. | |
| 2005/0156134 A1 | 7/2005 | Minor et al. | |
| 2005/0156135 A1 | 7/2005 | Minor et al. | |
| 2005/0156138 A1 | 7/2005 | Minor et al. | |
| 2005/0156139 A1 | 7/2005 | Minor et al. | |
| 2005/0263735 A1 | 12/2005 | Minor et al. | |
| 2005/0263736 A1 | 12/2005 | Minor et al. | |
| 2005/0263737 A1 | 12/2005 | Minor et al. | |
| 2005/0263738 A1 | 12/2005 | Minor et al. | |
| 2005/0284408 A1 | 12/2005 | Ritchey et al. | |
| 2005/0284409 A1 | 12/2005 | Ritchey et al. | |
| 2005/0285075 A1 | 12/2005 | Minor | |
| 2005/0285077 A1 | 12/2005 | Minor | |
| 2006/0124891 A1 | 6/2006 | Minor et al. | |
| 2006/0202155 A1 | 9/2006 | Minor et al. | |
| 2006/0208216 A1 | 9/2006 | Minor et al. | |
| 2006/0208217 A1 | 9/2006 | Minor et al. | |
| 2006/0243944 A1 | 11/2006 | Minor et al. | |
| 2006/0243945 A1 | 11/2006 | Minor et al. | |
| 2007/0114487 A1 | 5/2007 | Minor | |
| 2007/0138433 A1 | 6/2007 | Drigotas et al. | |
| 2007/0200086 A1 | 8/2007 | Minor et al. | |
| 2009/0249864 A1 | 10/2009 | Minor et al. | |
| 2009/0250650 A1 | 10/2009 | Minor et al. | |
| 2009/0278072 A1 | 11/2009 | Minor et al. | |
| 2010/0127208 A1 | 5/2010 | Nappa et al. | |
| 2010/0132387 A1 | 6/2010 | Nappa et al. | |
| 2011/0037017 A1 | 2/2011 | Leck | |
| 2011/0204279 A1 | 8/2011 | Minor et al. | |
| 2012/0042668 A1 | 2/2012 | Nappa et al. | |
| 2013/0015395 A1 | 1/2013 | Yana Motta et al. | |
| 2013/0020528 A1 | 1/2013 | Yana Motta et al. | |
| 2013/0213063 A1 | 8/2013 | Nappa et al. | |
| 2014/0222699 A1 | 8/2014 | Low | |
| 2014/0283537 A1 | 9/2014 | Minor et al. | |
| 2015/0068227 A1 | 3/2015 | Nappa et al. | |
| 2015/0083957 A1 | 3/2015 | Minor et al. | |
| 2015/0121910 A1 | 5/2015 | Yana Motta et al. | |
| 2015/0135745 A1 | 5/2015 | Nappa et al. | |
| 2016/0032164 A1 | 2/2016 | Nappa et al. | |
| 2016/0075927 A1 | 3/2016 | Fukushima | |
| 2016/0137898 A1 | 5/2016 | Minor et al. | |
| 2016/0333242 A1 * | 11/2016 | Fukushima | C09K 5/045 |
| 2016/0333243 A1 | 11/2016 | Fukushima | C09K 5/044 |
| 2016/0333245 A1 * | 11/2016 | Fujii | C09K 5/045 |
| 2016/0340565 A1 * | 11/2016 | Tasaka | C09K 5/045 |
| 2016/0347981 A1 * | 12/2016 | Fukushima | C09K 5/045 |
| 2016/0347982 A1 * | 12/2016 | Fukushima | C09K 5/045 |
| 2016/0355716 A1 * | 12/2016 | Fukushima | C09K 5/045 |
| 2016/0369146 A1 * | 12/2016 | Ueno | C09K 5/045 |
| 2017/0073559 A1 | 3/2017 | Minor et al. | |
| 2017/0073560 A1 | 3/2017 | Nappa et al. | |

FOREIGN PATENT DOCUMENTS

| | | |
|---|---|---|
| CA | 2 843 956 | 2/2013 |
| CA | 2 890 628 | 5/2014 |
| CN | 103732715 A | 4/2014 |
| CN | 103781872 A | 5/2014 |
| CN | 103890130 A | 6/2014 |
| CN | 104968756 A | 10/2015 |
| GB | 2493395 A | 2/2013 |
| JP | 10-502737 | 3/1998 |
| JP | 2007-511645 | 5/2007 |
| JP | 2008-500437 | 1/2008 |
| JP | 2008-531836 | 8/2008 |
| JP | 4571183 | 10/2010 |
| JP | 2014-520930 | 8/2014 |
| JP | 2014-520948 | 8/2014 |
| JP | 2014-525975 | 10/2014 |
| JP | 2016-503450 | 2/2016 |
| JP | 5850204 B2 | 2/2016 |
| KR | 10-2014-0050052 | 4/2014 |
| KR | 10-2014-0050065 | 4/2014 |
| KR | 10-2014-0068038 | 6/2014 |
| KR | 10-2015-0089026 | 8/2015 |
| MX | 2014000365 A | 3/2014 |
| MX | 2014000702 A | 7/2014 |
| MX | 2014001292 A | 11/2014 |
| MX | 2015006323 A | 9/2015 |
| RU | 2014 108 421 A | 9/2015 |
| TW | 201439297 A | 10/2014 |
| WO | WO 2005/105947 A2 | 11/2005 |
| WO | WO 2013/009488 A2 | 1/2013 |
| WO | WO 2013/012563 A2 | 1/2013 |
| WO | WO 2013/021174 A1 | 2/2013 |
| WO | WO 2014/081539 A1 | 5/2014 |
| WO | WO 2015/005290 A1 | 1/2015 |
| WO | 2015/125534 A1 | 8/2015 |

OTHER PUBLICATIONS

Written Opinion dated Apr. 12, 2016 in PCT/JP2016/053390 filed Feb. 4, 2016.
Extended European Search Report (EESR) from European Patent Office for the corresponding European Patent Application No. 16749144.8 dated Sep. 10, 2018, 7 pp.

* cited by examiner

US 10,377,934 B2

AIR-CONDITIONER WORKING FLUID FOR ELECTRIC VEHICLE AND AIR-CONDITIONER WORKING FLUID COMPOSITION FOR ELECTRIC VEHICLE

CROSS-REFERENCE TO RELATED APPLICATIONS

This application is a continuation of prior International Application No. PCT/JP2016/053390 filed on Feb. 4, 2016 which is based upon and claims the benefit of priority from Japanese Patent Application No. 2015-023579 filed on Feb. 9, 2015; the entire contents of all of which are incorporated herein by reference.

TECHNICAL FIELD

The present invention relates to an air-conditioner working fluid for electric vehicle and an air-conditioner working fluid composition for electric vehicle containing the same. Note that an "electric vehicle" in this description means a hybrid vehicle equipped with both an electric motor and a gasoline engine and a fuel cell vehicle as well as a so-called electric vehicle using only an electric motor as a power source.

BACKGROUND ART

In this description, for halogenated-hydrocarbon, an abbreviated name of a compound is described between parentheses after the compound name, and the abbreviated name is used in place of the compound name as needed in this description.

Generally, a gasoline vehicle travels by combusting gasoline being a fuel. For heating in the gasoline vehicle, a method is employed which utilizes waste heat of the gasoline combustion in the engine and heats air in the vehicle using heat of cooling water for cooling the engine. Further, for cooling in the gasoline vehicle, a method is employed which utilizes heat pump and cools the air in the vehicle using evaporation heat generated by evaporating coolant being a working fluid in an evaporator.

Conventionally, chlorofluorocarbon (CFC) such as dichlorodifluoromethane has been used as an air-conditioner working fluid for gasoline vehicle. However, CFC is pointed out as exerting influence on the ozone layer in the stratosphere, and is a subject to regulation at present.

From the above background, conventionally, hydrofluorocarbon (HFC) exerting less influence on the ozone layer, for example, 1,1,1,2-tetrafluoroethane (HFC-134a) has been widely used in place of CFC as the air-conditioner working fluid for gasoline vehicle.

HFC, however, is pointed out as possibly being a cause of global warming. For example, HFC-134a has a global warming potential (GWP) as high as 1430, and it is thus required to develop a low GWP working fluid. At this time, it is required to develop a working fluid allowing a device which has been used till now to be continuously used as it is, only by replacing HFC-134a.

Recently, expectations are concentrated on HFC having a carbon-carbon double bond that is likely to be decomposed by OH radicals in the air, namely, hydrofluoroolefin (HFO), as the working fluid exerting less influence on the ozone layer and less influence on global warming. In this description, saturated HFC is called HFC and discriminated from HFO unless otherwise stated. Further, HFC may be clearly described as saturated hydrofluorocarbon in some cases.

As the air-conditioner working fluid for gasoline vehicle capable of replacing the above HFC-134a, tetrafluoropropene, in particular, 2,3,3,3-tetrafluoropropene (HFO-1234yf) has been proposed (Patent Reference 1 (Japanese Patent No. 4571183)). HFO-1234yf has an extremely low GWP of 4 though having equivalent performance with that of HFC-134a.

On the other hand, the electric vehicle increases in penetration rate recently has a smaller amount of waste heat than that of the gasoline vehicle and cannot utilize waste heat of the engine for heating. Therefore, it is desired to develop an air-conditioner for electric vehicle utilizing heat pump also for heating in addition to cooling.

However, HFC-134a and HFO-1234yf are not sufficient in characteristics such as cycle performance as the air-conditioner working fluid for electric vehicle.

SUMMARY OF INVENTION

The present invention has been made from the above viewpoints, and its object is to provide an air-conditioner working fluid for electric vehicle exerting less influence on global warming, providing sufficient cycle performance in practical use as the air-conditioner working fluid for electric vehicle, in particular, sufficient cycle performance in the heating time, and usable without greatly changing the specifications of an air-conditioner device to which a conventional working fluid, for example, HFC-134a or HFO-1234yf is applied, and an air-conditioner working fluid composition for electric vehicle containing the same.

The present invention provides an air-conditioner working fluid for electric vehicle and an air-conditioner working fluid composition for electric vehicle containing the same, having the configurations described in the following [1] to [12].

[1] An air-conditioner working fluid for electric vehicle including trifluoroethylene (HFO-1123), difluoromethane (HFC-32) and 1,3,3,3-tetrafluoropropene (HFO-1234ze), wherein a percentage of a total amount of HFO-1123, HFC-32 and HFO-1234ze with respect to a total amount of the working fluid is more than 90 mass % and 100 mass % or less.

[2] The air-conditioner working fluid for electric vehicle according to [1], wherein a percentage of HFO-1123 is more than 0 mass % and 50 mass % or less, a percentage of HFC-32 is more than 0 mass % and 40 mass % or less, and a percentage of HFO-1234ze is 40 mass % or more and 90 mass % or less, with respect to the total amount of HFO-1123, HFC-32, and HFO-1234ze.

[3] The air-conditioner working fluid for electric vehicle according to [1], wherein a percentage of HFO-1123 is more than 0 mass % and 20 mass % or less, a percentage of HFC-32 is more than 0 mass % and 20 mass % or less, and a percentage of HFO-1234ze is 65 mass % or more and 90 mass % or less, with respect to the total amount of HFO-1123, HFC-32, and HFO-1234ze.

[4] The air-conditioner working fluid for electric vehicle according to [1], wherein the working fluid has a global warming potential (100 years) in the Intergovernmental Panel on Climate Change (IPCC) Fourth Assessment Report of less than 400.

[5] The air-conditioner working fluid for electric vehicle according to [4], wherein the working fluid has a global warming potential of less than 300.

[6] The air-conditioner working fluid for electric vehicle according to [4], wherein the working fluid has a global warming potential of less than 200.

[7] The air-conditioner working fluid for electric vehicle according to [1], wherein the HFO-1234ze contains 60 mass % or more of trans-HFO-1234ze.

[8] The air-conditioner working fluid for electric vehicle according to [1], wherein the working fluid further includes 2,3,3,3-tetrafluoropropene (HFO-1234yf).

[9] The air-conditioner working fluid for electric vehicle according to [1], wherein the working fluid consists of HFO-1123, HFC-32, and HFO-1234ze.

[10] The air-conditioner working fluid for electric vehicle according to [1], wherein the working fluid consists of HFO-1123, HFC-32, HFO-1234ze, and HFO-1234yf.

[11] The air-conditioner working fluid for electric vehicle according to [1], wherein an air-conditioner for electric vehicle performs cooling and heating by a heat pump.

[12] An air-conditioner working fluid composition for electric vehicle including the air-conditioner working fluid for electric vehicle according to [1] and a lubricating oil.

According to the present invention, it is possible to provide an air-conditioner working fluid for electric vehicle suppressing influence on global warming, providing sufficient cycle performance in practical use as a working fluid for electric vehicle, in particular, sufficient cycle performance also in the heating time in addition to the cooling time, and usable without greatly changing the specifications of an air-conditioner device to which a conventional working fluid, for example, HFC-134a or HFO-1234yf is applied, and an air-conditioner working fluid composition for electric vehicle containing the same.

DESCRIPTION OF EMBODIMENTS

Embodiments of the present invention will be hereinafter described.
<Working Fluid>
An air-conditioner working fluid for electric vehicle (hereinafter, referred to simply as a working fluid) of the present invention contains HFO-1123, HFC-32, and HFO-1234ze, and has a percentage of the total amount of HFO-1123, HFC-32, and HFO-1234ze relative to the total amount of the working fluid of more than 90 mass % and 100 mass % or less.

In the present invention, as an air-conditioner for electric vehicle, an air-conditioner constituted of heat exchangers such as a condenser and an evaporator can be exemplified without any limitation.

[Characteristics of HFO-1123, HFC-32, and HFO-1234ze]

Characteristics of HFO-1123, HFC-32, and HFO-1234ze contained in the working fluid of the present invention as the working fluid, specifically, cycle performance, load on apparatus during operation of the air-conditioner (hereinafter, referred to simply as load on an apparatus), GWP, and self-decomposition will be described. Characteristics of HFO-1123, HFC-32, and HFO-1234ze are listed in Table 1 in comparison with HFO-1234yf.

HFO-1234ze includes a cis isomer of HFO-1234ze (HFO-1234ze(Z)), a trans isomer of HFO-1234ze (HFO-1234ze (E)), and a mixture of HFO-1234ze(E) and HFO-1234ze(Z). Hereinafter, in the case of clearly discriminating the cis isomer from the trans isomer, they are described as HFO-1234ze(Z) and HFO-1234ze(E) respectively. In Table 1, characteristics of HFO-1234ze(E) are listed as a representative of HFO-1234ze.

(Cycle Performance)

Figure 2:
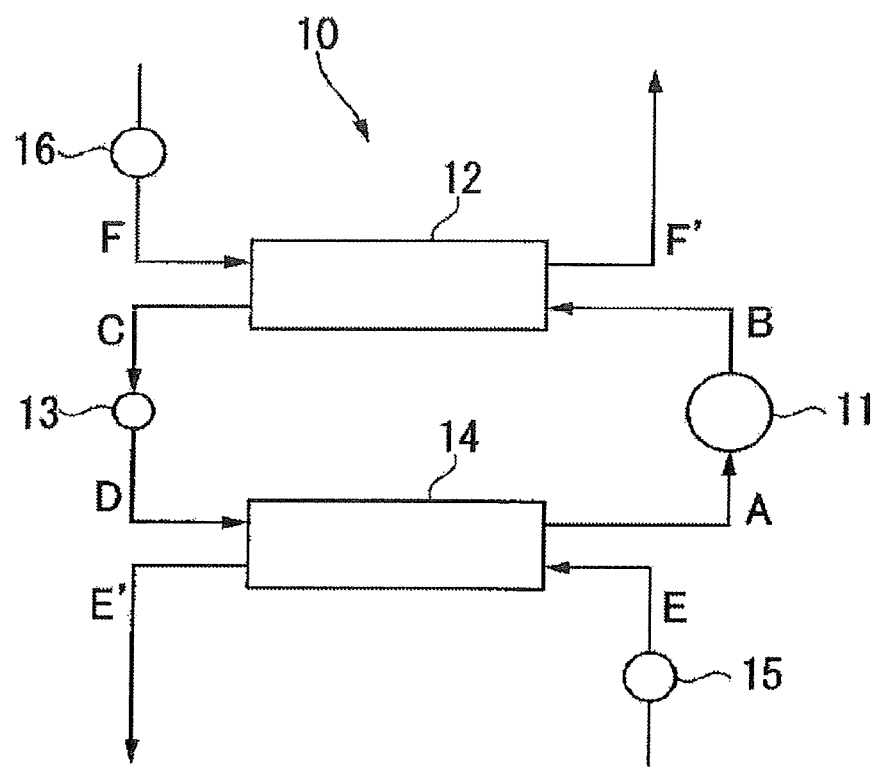
FIG. 2 is a schematic configuration diagram illustrating an example of a refrigeration cycle system for evaluating the air-conditioner working fluid for electric vehicle of the present invention.

Examples of the cycle performance include the coefficient of performance and the refrigerating capacity evaluated by a refrigeration cycle system illustrated in FIG. 2. The coefficient of performance and the refrigerating capacity of HFO-1123, HFC-32, and HFO-1234ze(E) are listed in Table 1 as the relative coefficient of performance and the relative refrigerating capacity using those of HFO-1234yf as references (1.000). Each of the relative coefficient of performance and the relative refrigerating capacity being larger than 1 indicates that the working fluid is better in cycle performance than HFO-1234yf.

(Load on Apparatus)

The load on an apparatus is evaluated, for example, from a compressor discharge gas temperature (hereinafter, referred to as a discharge temperature) of the working fluid to be discharged from the compressor 11 of a refrigeration cycle system 10 illustrated in FIG. 2 and a compressor discharge gas pressure (hereinafter, referred to as a discharge pressure) of the working fluid to be discharged. Note that the schematic configuration and the cycle of the refrigeration cycle system 10 are as described later.

A temperature difference (TΔ) obtained by subtracting the discharge temperature in the case of using HFO-1234yf from the discharge temperature in the case of using HFO-1123, HFC-32, or HFO-1234ze(E), and a pressure ratio of the discharge pressure in the case of using HFO-1123, HFC-32, or HFO-1234ze(E) to the discharge pressure in the case of using HFO-1234yf are listed in Table 1.

A smaller TΔ indicates that the difference in discharge temperature is smaller than that of HFO-1234yf. A smaller pressure ratio indicates that the discharge pressure is smaller than that of HFO-1234yf. Each of the smaller TΔ and the smaller pressure ratio indicates that the working fluid is smaller in load on an apparatus.

(GWP)

The global warming potential (GWP) is the value over 100 years in the Intergovernmental Panel on Climate Change (IPCC) Fourth Assessment Report (2007) unless otherwise stated. Besides, the GWP in the working fluid being a mixture is a weighted average by composition masses of components. Note that the global warming potential (100 years) of HFO-1123 is not described in the IPCC Fourth Assessment Report, and therefore a value measured according to the above is used. A lower GWP indicates that the working fluid has less influence on global warming.

TABLE 1

| | Cycle performance (relative to HFO-1234yf) | | Load on apparatus (relative to HFO-1234yf) | | |
|---|---|---|---|---|---|
| | Relative coefficient of performance | Relative refrigerating capacity | TΔ[° C.] | Pressure ratio | GWP |
| HFO-1234yf | 1.000 | 1.000 | 0.00 | 1.0 | 4.0 |
| HFO-1123 | 0.881 | 2.718 | 25.55 | 2.9 | 0.3 |
| HFC-32 | 0.964 | 2.630 | 40.71 | 2.5 | 675.0 |
| HFO-1234ze(E) | 1.036 | 0.796 | 0.38 | 0.8 | 6.0 |

It is found from Table 1 that HFO-1123 is extremely excellent in refrigerating capacity as the working fluid and low in GWP as compared with HFO-1234yf. On the other hand, it is found that HFO-1123 exerts great load on an apparatus. It is also found that HFC-32 is extremely excellent in refrigerating capacity as the working fluid as compared with HFO-1234yf. Note that HFO-1123 is known to undergo so-called self-decomposition when there is an ignition source at higher temperature or under high pressure, but can be prevented from self-decomposition by combination with HFC-32 that is a compound not undergoing self-decomposition.

HFO-1123 and HFC-32 can form a pseudo-azeotropic mixture close to an azeotropic mixture in a composition range of 99:1 to 1:99 by mass ratio, and HFC-32 is advantageous as a compound to be combined with HFO-1123. HFC-32 is high in GWP but is ½ or less of 1430 of HFC-134a, even if it is independently used, and can suppress the GWP of the working fluid of the present invention when it is used in combination with HFO-1123.

Meanwhile, both HFO-1123 and HFC-32 are large in relative load on an apparatus. However, the working fluid of the present invention further contains HFO-1234ze and therefore is small in relative load on an apparatus. Further, HFO-1234ze is better in relative coefficient of performance than HFO-1123, HFC-32, and HFO-1234yf, and therefore the working fluid of the present invention combined HFO-1234ze with HFO-1123 and HFC-32 is excellent in balance in cycle performance. Furthermore, HFO-1234ze is extremely low in GWP because it is HFO.

The working fluid of the present invention is a working fluid that contains HFO-1123, HFC-32, and HFO-1234ze at arbitrary percentages and is thereby well-balanced by taking advantages of the features of the individual compounds and complementing their drawbacks. The working fluid of the present invention is better in cycle performance than HFC-134a or HFO-1234yf which have been conventionally used, and can achieve sufficient performance and efficiency during both cooling and heating in the air-conditioner for electric vehicle using the working fluid of the present invention. Further, the working fluid of the present invention is sufficiently low in GWP and is small in load on an apparatus at a level where it is possible to replace HFC-134a or HFO-1234yf.

A preferable composition of HFO-1123, HFC-32, and HFO-1234ze in the working fluid of the present invention has a percentage of HFO-1123 of more than 0 mass % and 50 mass % or less, a percentage of HFC-32 of more than 0 mass % and 40 mass % or less, and a percentage of HFO-1234ze of 40 mass % or more and 90 mass % or less, relative to the total amount of HFO-1123, HFC-32, and HFO-1234ze.

A more preferable composition of HFO-1123, HFC-32, and HFO-1234ze has a percentage of HFO-1123 of more than 0 mass % and 20 mass % or less, a percentage of HFC-32 of more than 0 mass % and 20 mass % or less, and a percentage of HFO-1234ze of 65 mass % or more and 90 mass % or less, relative to the total amount of HFO-1123, HFC-32, and HFO-1234ze.

In any of the above cases, the percentage of HFO-1123 relative to the total amount of HFO-1123, HFC-32, and HFO-1234ze in the working fluid of the present invention is preferably 2 mass % or more and more preferably 4 mass % or more. The percentage of HFC-32 relative to the total amount of HFO-1123, HFC-32, and HFO-1234ze in the working fluid of the present invention is preferably 4 mass % or more and more preferably 6 mass % or more.

The working fluid of the present invention has a percentage of the total amount of HFO-1123, HFC-32, and HFO-1234ze relative to the total amount of the working fluid of more than 90 mass % and 100 mass % or less. The working fluid of the present invention preferably contains a component other than HFO-1123, HFC-32, and HFO-1234ze at a percentage of less than 10 mass %. As the other component, a later-described component can be used. Note that the working fluid of the present invention is preferably a mixture composed of only three components such as HFO-1123, HFC-32, and HFO-1234ze without containing the other component.

HFO-1234ze preferably contains 60 mass % or more of HFO-1234ze(E). The percentage of HFO-1234ze(E) in HFO-1234ze is more preferably 60 to 100 mass %, particularly preferably 99.5 to 100 mass %, and most preferably 100 mass %.

[Characteristics of Working Fluid]

Figure 1A:
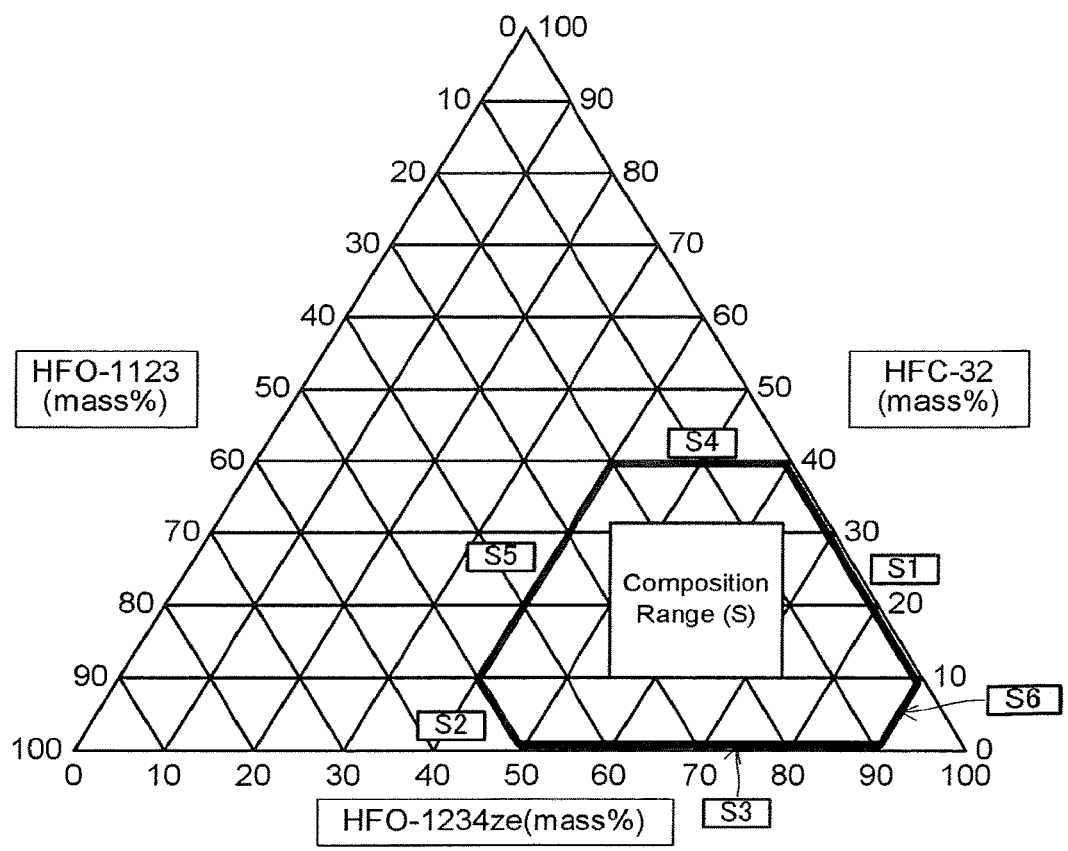
FIG. 1A is a triangular coordinate chart of HFO-1123, HFC-32, and HFO-1234ze indicating a preferable composition range of an air-conditioner working fluid for electric vehicle of the present invention.
Figure 1B:
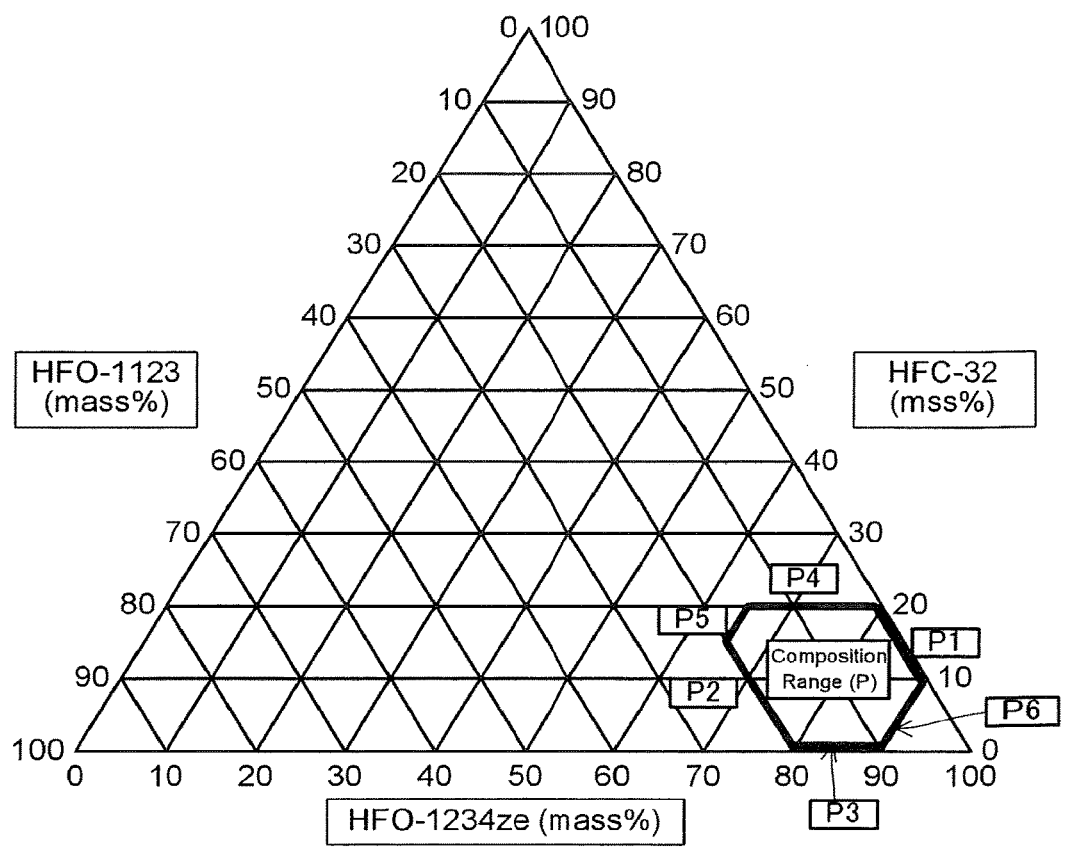
FIG. 1B is a triangular coordinate chart of HFO-1123, HFC-32, and HFO-1234ze indicating a more preferable composition range of the air-conditioner working fluid for electric vehicle of the present invention.

Hereinafter, the relation between the composition when the working fluid in an embodiment of the present invention is a mixture composed of only HFO-1123, HFC-32, and HFO-1234ze, and characteristics as the working fluid, specifically, the cycle performance, load on an apparatus, GWP, and self-decomposition will be described referring to FIG. 1A and FIG. 1B. FIG. 1A and FIG. 1B are each a triangular coordinate chart having three sides indicating compositions (mass %) of HFO-1123, HFC-32, and HFO-1234ze respectively.

In FIG. 1A, a preferable composition range when the working fluid in the embodiment of the present invention is composed of only HFO-1123, HFC-32, and HFO-1234ze is illustrated by a hexagonal region surrounded by a bold solid line. This region is referred to as a composition range (S).

The composition range (S) illustrates, precisely, ranges of the preferable percentages of HFO-1123, HFC-32, and HFO-1234ze relative to the total amount of the working fluid expressed by the following three expressions on the triangular coordinate chart. It should be noted that the abbreviated name of each compound in each of the following expressions indicates the percentage (mass %) of the compound relative to the total amount of the working fluid, namely, the total amount of HFO-1123, HFC-32, and HFO-1234ze.

0 mass % < HFO-1123 ≤ 50 mass %
0 mass % < HFC-32 ≤ 40 mass %
40 mass % ≤ HFO-1234ze ≤ 90 mass %

Accordingly, sides (S1) to (S6) of the hexagon indicating the composition range (S) indicate boundary lines of the following ranges respectively.

(S1) 0 mass % < HFO-1123
(S2) HFO-1123 ≤ 50 mass %
(S3) 0 mass % < HFC-32

(S4) HFC-32≤40 mass %
(S5) 40 mass %≤HFO-1234ze
(S6) 90 mass %≥HFO-1234ze

Further, a composition range more preferable than the above is a composition range where ranges of the preferable percentages of HFO-1123, HFC-32, and HFO-1234ze relative to the total amount of the working fluid are expressed by the following three expressions. It should be noted that the abbreviated name of each compound in each of the following expressions indicates, similarly to the above, the percentage (mass %) of the compound relative to the total amount of the working fluid similarly to the above.

0 mass %<HFO-1123≤20 mass %
0 mass %<HFC-32≤20 mass %
65 mass %≤HFO-1234ze≤90 mass %

The more preferable composition range is illustrated by a hexagonal region surrounded by a bold solid line in FIG. 1B. This region is referred to as a composition range (P). Further, sides (P1) to (P6) of the hexagon indicating the composition range (P) indicate boundary lines of the following ranges respectively.

(P1) 0 mass %<HFO-1123
(P2) HFO-1123≤20 mass %
(P3) 0 mass %<HFC-32
(P4) HFC-32≤20 mass %
(P5) 65 mass %≤HFO-1234ze
(P6) 90 mass %≥HFO-1234ze (Evaluation Methods of Cycle Performance and Load on Apparatus)

The cycle performance (coefficient of performance (COP), refrigerating capacity (Q)), load on apparatus (discharge temperature (Tx), discharge pressure (Px)) of the working fluid can be evaluated, for example, using the refrigeration cycle system whose schematic configuration is illustrated in FIG. 2.

The refrigeration cycle system 10 illustrated in FIG. 2 is a system schematically configured including: a compressor 11 that compresses working fluid vapor A to make it into working fluid vapor B at high temperature and high pressure; a condenser 12 that cools and liquefies the working fluid vapor B emitted from the compressor 11 to make it into a working fluid C at low temperature and high pressure; an expansion valve 13 that expands the working fluid C emitted from the condenser 12 to make it into a working fluid D at low temperature and low pressure; an evaporator 14 that heats the working fluid D emitted from the expansion valve 13 to make it into the working fluid vapor A at high temperature and low pressure; a pump 15 that supplies load fluid E to the evaporator 14; and a pump 16 that supplies fluid F to the condenser 12.

In the refrigeration cycle system 10, the cycle of the following (i) to (iv) is repeated.

(i) Compressing the working fluid vapor A emitted from the evaporator 14 in the compressor 11 to make it into the working fluid vapor B at high temperature and high pressure (hereinafter, referred to as an "AB process").
(ii) Cooling and liquefying the working fluid vapor B emitted from the compressor 11 by the fluid F in the condenser 12 to make it into the working fluid C at low temperature and high pressure. In this event, the fluid F is heated to be made into fluid F' and emitted from the condenser 12 (hereinafter, referred to as a "BC process").
(iii) Expanding the working fluid C emitted from the condenser 12 in the expansion valve 13 to make it into the working fluid D at low temperature and low pressure (hereinafter, referred to as a "CD process").
(iv) Heating the working fluid D emitted from the expansion valve 13 by the load fluid E in the evaporator 14 to make it into the working fluid vapor A at high temperature and low pressure. In this event, the load fluid E is cooled to be made into load fluid E' and emitted from the evaporator 14 (hereinafter, referred to as a "DA process").

The refrigeration cycle system 10 is a cycle system realized by an adiabatic and isoentropic change, an isenthalpic change, and an isobaric change. The change of state of the working fluid can be expressed as a trapezoid having A, B, C, D as vertices when the change is illustrated on a pressure-enthalpy line (curve) diagram illustrated in FIG. 3.

Figure 3:
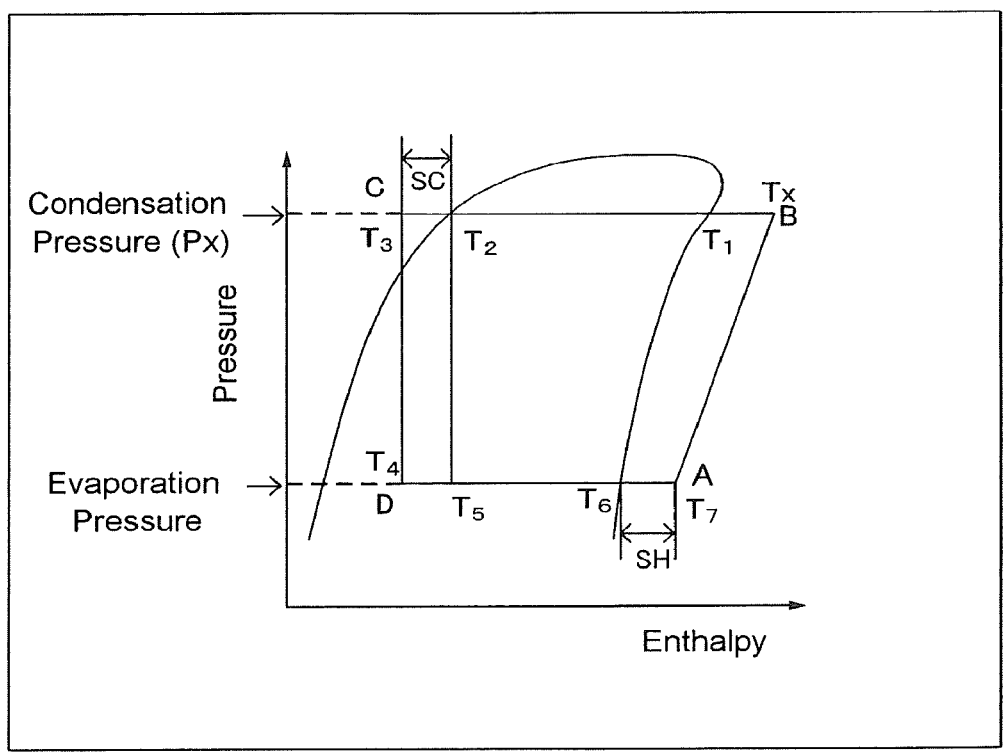
FIG. 3 is a cycle chart illustrating change of state of the working fluid in the refrigeration cycle system in FIG. 2 on a pressure-enthalpy line diagram.

The AB process is a process of performing adiabatic compression in the compressor 11 to make the working fluid vapor A at high temperature and low pressure into the working fluid vapor B at high temperature and high pressure, and is indicated by an AB line in FIG. 3. As will be described later, the working fluid vapor A is introduced, in a superheated state, into the compressor 11, and therefore the working fluid vapor B to be obtained therein is vapor also in a superheated state. The discharge temperature and the discharge pressure are a temperature (Tx) and a pressure (Px) in the state of B in FIG. 3, and are the highest temperature and the highest pressure in the refrigeration cycle. Note that, as will be described later, the BC process is isobaric cooling, and therefore the discharge pressure exhibits the same value as that of the condensation pressure. Accordingly, the condensation pressure is expressed as Px for convenience in FIG. 3.

The BC process is a process of performing isobaric cooling in the condenser 12 to make the working fluid vapor B at high temperature and high pressure into the working fluid vapor C at low temperature and high pressure, and is indicated by a BC line in FIG. 3. The pressure in this event is the condensation pressure. An intersection point $T_1$ on a high enthalpy side of intersection points of the pressure-enthalpy line and the BC line is a condensation temperature, and an intersection point $T_2$ on a low enthalpy side is a condensation boiling temperature.

The CD process is a process of performing isenthalpic expansion in the expansion valve 13 to make the working fluid C at low temperature and high pressure into the working fluid D at low temperature and low pressure, and is indicated by a CD line in FIG. 3. Note that when the temperature at the working fluid C at low temperature and high pressure is indicated by a temperature $T_3$, $T_2$-$T_3$ is a degree of supercooling (SC) of the working fluid in the cycle of (i) to (iv).

The DA process is a process of performing isobaric heating in the evaporator 14 to return the working fluid D at low temperature and low pressure to the working fluid vapor A at high temperature and low pressure, and is indicated by a DA line in FIG. 3. The pressure in this event is the evaporation pressure. An intersection point $T_6$ on a high enthalpy side of intersection points of the pressure-enthalpy line and the DA line is an evaporation temperature. When the temperature of the working fluid vapor A is indicated by a temperature $T_7$, $T_7$-$T_6$ is a degree of superheating (SH) of the working fluid in the cycle of (i) to (iv). Note that $T_4$ indicates the temperature of the working fluid D.

The refrigerating capacity (Q) and the coefficient of performance (COP) of the working fluid are obtained respectively from the following Expressions (11) and (12) when using enthalpies $h_A$, $h_B$, $h_C$ and $h_D$ in respective states of A (after evaporation, at high temperature and low pressure), B (after compression, at high temperature and high pressure), C (after condensation, at low temperature and high pressure), and D (after expansion, at low temperature and low pressure) of the working fluid. It is assumed that there is no loss due to equipment efficiency and no pressure loss in pipes and heat exchangers.

The thermodynamic property required for calculation of the cycle performance of the working fluid can be calculated based on a generalized state equation (Soave-Reclich-Kwong equation) based on a principle of corresponding states, and on thermodynamic relational expressions. When the characteristic value cannot be obtained, calculation is performed using an estimation method based on an atomic group contribution method.

$$Q = h_A - h_D \tag{11}$$

$$COP = Q/\text{compression work} = (h_A - h_D)/(h_B - h_A) \tag{12}$$

Q expressed by the above ($h_A - h_D$) corresponds to an output (kW) of the refrigeration cycle, and the compression work expressed by ($h_B - h_A$), for example, electric energy required to operate the compressor corresponds to consumed motive power (kW). Besides, Q means the capability of refrigerating the load fluid, and a higher Q means that the same system can perform a larger amount of work. In other words, having a high Q indicates that a target performance can be obtained by a small amount of working fluid, thus enabling downsizing of the system.

Note that the above description is based on the numerical values when the evaluation is made at the following temperatures as temperature conditions of the refrigeration cycle.

Evaporation temperature; 0° C. (however, an average temperature of an evaporation start temperature and an evaporation completion temperature in the case of a zeotropic mixture)

Condensation completion temperature; 40° C. (however, an average temperature of a condensation start temperature and a condensation completion temperature in the case of a zeotropic mixture)

Degree of supercooling (SC); 5° C.
Degree of superheating (SH); 5° C.
(GWP)

The working fluid of the present invention is a mixture and therefore its GWP is calculated as a weighted average using composition masses of components. Since the GWPs of HFO-1123 and HFO-1234ze are extremely low as compared with the GWP of HFC-32, the GWP of the working fluid of the present invention containing HFO-1123, HFC-32, and HFO-1234ze greatly depends on the content of HFC-32.

Accordingly, in the working fluid of the present invention, a lower side of the triangular coordinate chart, namely, a mixture of a composition having a low ratio of HFC-32 is low in GWP. In the composition range (S), the GWP is about 273 at most. The composition region is a composition at an upper part of the composition range (S), namely, a composition near the side of (S4). Besides, in a composition near the side of (S3), for example, even a composition having 4 mass % of HFC-32 has a GWP in a range of 30 to 32, which is particularly low. In the composition range (P), the GWP is about 140 at most. The composition region is a composition at an upper part of the composition range (P), namely, a composition near a side of (P4). Besides, in a composition near a side of (P3), for example, even a composition having 4 mass % of HFC-32 has a GWP in a range of around 32, which is particularly low.

The working fluid of the present invention is preferably composed of only HFO-1123, HFC-32, and HFO-1234ze, and also preferably contains another component other than them at a percentage of less than 10 mass %. As the other component, a component that does not excessively increase the GWP of the working fluid is preferable. The GWP of the working fluid of the present invention is preferably less than 400, more preferably less than 300, and furthermore preferably less than 200. The GWP is particularly preferably 150 or less.

(Cycle Performance)

In the triangular coordinate chart indicating the composition ranges of HFO-1123, HFC-32, and HFO-1234ze in the working fluid of the present invention, mixtures of compositions having a relative coefficient of performance of 1.000 or more as compared with that of HFO-1234yf have compositions in a lower right region. The relative coefficient of performance depends on the content of HFO-1234ze, and is larger as the content of HFO-1234ze is larger.

Further, in the triangular coordinate chart, mixtures of compositions having a relative refrigerating capacity of 1.000 or more as compared with that of HFO-1234yf have compositions in an almost entire region. The relative refrigerating capacity increases from a lower right vertex (HFO-1234ze=100 mass %) toward a left side (mixtures of HFO-1123 and HFC-32) in the triangular coordinate chart. The relative refrigerating capacity greatly depends on the content of HFO-1234ze, and is smaller as the content of HFO-1234ze is larger.

The relative coefficient of performance is approximately 1.000 or more regarding a mixture of a composition having a percentage of HFO-1234ze of 60 mass % or more in the above composition range (S). The relative refrigerating capacity is 1.000 or more regarding mixtures of all compositions in the above composition range (S), and 1.500 or more in mixtures of the compositions other than those near the lower right. As for the relative coefficient of performance and the relative refrigerating capacity in the above composition range (P), the relative coefficient of performance and the relative refrigerating capacity are 1.000 or more regarding mixtures of all compositions in the above composition range (P), and the relative refrigerating capacity is 1.400 or more near the side of (P5).

When the working fluid of the present invention contains the other component, a component that does not excessively decrease the relative coefficient of performance and the relative refrigerating capacity of the working fluid is preferable as the other component.

(Load on Apparatus)

The discharge temperature in the refrigeration cycle is the highest temperature in the refrigeration cycle as described above. Therefore, the discharge temperature influences heat resistance of devices and materials constituting the apparatuses of the air-conditioner, and a refrigerant oil and a polymeric material that are normally contained in the composition containing the working fluid in addition to the working fluid. To substitute for HFO-1234yf, the discharge temperature difference from HFO-1234yf (hereinafter, referred also to as TΔ) needs to be a temperature difference that the devices and materials constituting the apparatuses of the air-conditioner operating by HFO-1234yf can tolerate.

In the triangular coordinate chart, mixtures of compositions near the lower right vertex (HFO-1234ze=100 mass %) are small in TΔ. Note that even for a composition relatively large in TΔ, the various problems deriving from the discharge temperature can be solved by appropriately adjusting the setting of the devices and materials constituting the apparatuses of the air-conditioner such as the heat exchangers such as the evaporator, the condenser and so on.

TΔ is 7 to 28° C. in mixtures of almost all compositions in the composition range (S). TΔ is 7 to 18° C. in mixtures of almost all compositions in the composition range (P). TΔ within this range is the range that the devices and materials constituting the apparatuses of the air-conditioner operating by HFO-1234yf can tolerate.

When the working fluid of the present invention contains the other component, a compound low in discharge temperature is preferable as the other component.

The discharge pressure in the refrigeration cycle is the highest pressure in the refrigeration cycle as describe above. A ratio of the discharge pressure of the working fluid with respect to HFO-1234yf (hereinafter, referred to as a discharge pressure ratio) is preferably smaller because the discharge pressure ratio influences the devices and materials constituting the apparatuses of the air-conditioner. To substitute for HFO-1234yf, the discharge pressure is preferably lower than the discharge pressure of HFO-1234yf. Besides, even if it is high, the pressure needs to be a pressure that the devices and materials constituting the apparatuses of the air-conditioner operating by HFO-1234yf can tolerate. The discharge pressure ratio is preferably 2.7 or smaller, more preferably 2.0 or smaller, and particularly preferably 1.5 or smaller.

In the triangular coordinate chart, the discharge pressure ratio decreases from the left side (mixtures of HFO-1123 and HFC-32) toward the lower right vertex (HFO-1234ze=100 mass %). The discharge pressure ratio can be said to greatly depend on the content of HFO-1234ze. Note that even for a composition relatively large in discharge pressure ratio, the various problems deriving from the discharge pressure can be solved by appropriately adjusting the setting of the devices and materials constituting the apparatuses of the air-conditioner such as the heat exchangers such as the evaporator, the condenser and so on.

The discharge pressure ratio is 1.0 or less, that is smallest, in mixtures of compositions near the lower right in the composition range (S), the composition range (P), namely, near the side of (S6), (P6). Further, in the composition range (S), the discharge pressure ratio is largest in a mixture of a composition near the side of (S5), and is 2.0 or less even near there. In the mixtures of compositions in the composition range (P), the discharge pressure ratio is largest in a mixture of a composition near the side of (P5), and is 1.5 or less even near there. The discharge pressure ratio, if in this range, is the range that the devices and materials constituting the apparatuses of the air-conditioner operating by HFO-1234yf can tolerate.

When the working fluid of the present invention contains the other component, a compound low in discharge pressure is preferable as the other component.

(Self-Decomposition)

In the present invention, the evaluation of the self-decomposition was performed using a facility compliant with the A method recommended as a facility for measuring a combustion range of gas made by mixing gas containing halogen in an individual notification in High Pressure Gas Safety Act.

To be more precise, a mixture made by mixing HFO-1123, HFC-32, and HFO-1234ze at various percentages was enclosed, to a predetermined pressure, within a spherical pressure tight case having an internal volume of 650 cm$^3$ controlled to a predetermined temperature from the outside, and then an energy of about 30 J was applied thereto by fusing a platinum wire installed therein. The temperature and pressure changes in the pressure tight case occurring after the application were measured, and when pressure rise and temperature rise were recognized, presence of self-decomposition was determined.

In the triangular coordinate chart of the present invention, the mixtures of compositions at the lower left exhibit self-decomposition. Note that even for the mixture exhibiting self-decomposition, the various problems in self-decomposition can be solved sometimes by appropriately adjusting the setting of the devices and materials constituting the apparatuses of the air-conditioner such as the heat exchangers such as the evaporator, the condenser and so on.

In the working fluid, mixtures of all compositions in the composition range (S) and all compositions in the composition range (P) do not exhibit self-decomposition. Accordingly, the mixtures can be used as a substitute fluid of HFO-1234yf without changing the specifications of the conventional devices and materials constituting the apparatuses of the air-conditioner operating by HFO-1234yf.

When the working fluid of the present invention contains the other component, a compound having no self-decomposition is preferable as the other component.

As described above, the working fluid of the present invention is a working fluid in which the characteristics of respective HFO-1123, HFC-32, and HFO-1234ze are exhibited in good balance and their drawbacks are suppressed. In particular, the working fluid having the composition range (S) and further the composition range (P) is suppressed to be low in GWP, made to secure durability, and low in discharge pressure when it is used for the air-conditioner for electric vehicle, and therefore can be used without greatly changing the specifications of the devices of the air-conditioner for the conventional working fluid, for example, HFC-134a or HFO-1234yf. Further, the working fluid of the present invention is a working fluid which has certain capability and efficiency and thereby can provide cycle performance better than that of the conventional working fluid.

[Other Component]

The working fluid of the present invention preferably contains, as the other component, a compound normally used as the working fluid at a percentage of 0 mass % or more and less than 10 mass % of the total amount of the working fluid.

Examples the other component include HFC other than HFC-32, and HFO (HFC having a carbon-carbon double bond) other than HFO-1123 and HFO-1234ze.

(HFC Other than HFC-32)

As HFC other than HFC-32 as the other component, HFC having a function of improving the capability of the working fluid of the present invention or further increasing the efficiency or the like is used. When HFC other than HFC-32 is contained, better cycle performance can be obtained.

Note that HFC is known to be higher in GWP than HFO-1123 and HFO-1234ze. Accordingly, HFC as the other component is selected from the viewpoint of keeping GWP in the allowable range in addition to improvement in cycle performance as the working fluid.

As HFC being the other component exerting less influence on the ozone layer and less influence on global warming, concretely, HFC having 1 to 5 carbon atoms is preferable. HFC other than HFC-32 may be linear, branched, or cyclic.

Concrete examples of HFC other than HFC-32 include difluoroethane, trifluoroethane, tetrafluoroethane, pentafluoroethane (HFC-125), pentafluoropropane, hexafluoropropane, heptafluoropropane, pentafluorobutane, heptafluorocyclopentane and the like.

Among them, as HFC other than HFC-32, 1,1-difluoroethane (HFC-152a), 1,1,1-trifluoroethane (HFC-143a), 1,1,2,2-tetrafluoroethane (HFC-134), HFC-134a, and HFC- 125 are preferable, and HFC-134a and HFC-125 are more preferable, in terms of exerting less influence on the ozone layer and being excellent in refrigeration cycle characteristics.

However, HFC-134a and HFC-125 have extremely high global warming potentials of 1430 and 3500 respectively. In the case of using them as the other component in the working fluid, care should be taken not to increase the GWP of the working fluid beyond the allowable range. As for HFC other than HFC-32, one kind may be used independently, or two or more kinds may be used in combination.

(HFO Other than HFO-1123 and HFO-1234ze)
Concrete examples of HFO other than HFO-1123 and HFO-1234ze as the other component include 1,2-difluoroethylene (HFO-1132), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), HFO-1234yf, 3,3,3-trifluoropropene (HFO-1243zf) and the like.

Among them, as HFO other than HFO-1123 and HFO-1234ze, HFO-1234yf is preferable in terms of having high critical temperature and being excellent in durability and coefficient of performance. As for HFO other than HFO-1123 and HFO-1234ze, one kind may be used independently, or two or more kinds may be used in combination.

In the case where the working fluid of the present invention contains the other component, its content is less than 10 mass %, and is preferably 8 mass % or less.

The content of the other component, when the working fluid of the present invention is used in thermal cycle, is appropriately adjusted in the above range from the viewpoint of securing the durability and improving the capability or further increasing the efficiency and in consideration of the global warming potential.

Note that the composition range by HFO-1123, HFC-32, and HFO-1234ze in the working fluid of the present invention is a composition which is already well-balanced among the durability, refrigerating capacity, coefficient of performance, and global warming potential only by the three components, and therefore has difficulty in improving any of the characteristics without losing the balance due to further addition of the other component in some cases. Particularly, when the working fluid is within the above-described preferable composition range, the improvement is more difficult. Accordingly, it is preferable that the present invention does not contain the other component excluding the following other arbitrary component which is compounded for the purpose of improvement in solubility with respect to lubricating oil, flame retardation or the like.

(Other Arbitrary Component)
The working fluid of the present invention may contain, other than the above other component, carbon dioxide, hydrocarbon, chlorofluoroolefin (CFO), hydrochlorofluoroolefin (HCFO) and the like. As these components (hereinafter, these components are referred to as other arbitrary components), components exerting less influence on the ozone layer and less influence on global warming are preferable.

Examples of hydrocarbon include propane, propylene, cyclopropane, butane, isobutane, pentane, isopentane and the like. As for hydrocarbon, one kind may be used independently, or two or more kinds may be used in combination.

When the working fluid of the present invention contains hydrocarbon, its content is less than 10 mass % with respect to 100 mass % of the working fluid, and is preferably 1 to 5 mass % and more preferably 3 to 5 mass %. When the content of hydrocarbon is equal to or more than the lower limit value, the solubility of a mineral-based lubricating oil to the working fluid becomes better.

Examples of CFO include chlorofluoropropene, chlorofluoroethylene and the like. In terms of easily suppressing the combustibility of the working fluid without greatly decreasing the cycle performance of the working fluid of the present invention, 1,1-dichloro-2,3,3,3-tetrafluoropropene (CFO-1214ya), 1,3-dichloro-1,2,3,3,3-tetrafluoropropene (CFO-1214yb), 1,2-dichloro-1,2-difluoroethylene (CFO-1112) are preferable as CFO. As for CFO, one kind may be used independently, or two or more kinds may be used in combination.

When the working fluid of the present invention contains CFO, its content is less than 10 mass % with respect to 100 mass % of the working fluid, and is preferably 1 to 8 mass % and more preferably 2 to 5 mass %. When the content of CFO is equal to or more than the lower limit value, the combustibility of the working fluid is easily suppressed. When the content of CFO is equal to or less than the upper limit value, excellent cycle performance is easily obtained.

Examples of HCFO include hydrochlorofluoropropene, hydrochlorofluoroethylene and the like. In terms of easily suppressing the combustibility of the working fluid without greatly decreasing the cycle performance of the working fluid of the present invention, 1-chloro-2,3,3,3-tetrafluoropropene (HCFO-1224yd), 1-chloro-1,2-difluoroethylene (HCFO-1122) are preferable as HCFO. As for HCFO, one kind may be used independently, or two or more kinds may be used in combination.

When the working fluid of the present invention contains HCFO, the content of HCFO in 100 mass % of the working fluid of the present invention is less than 10 mass %, and is preferably 1 to 8 mass % and more preferably 2 to 5 mass %. When the content of HCFO is equal to or more than the lower limit value, the combustibility of the working fluid is easily suppressed. When the content of HCFO is equal to or less than the upper limit value, excellent cycle performance is easily obtained.

When the working fluid of the present invention contains the other component and the other arbitrary component as described above, the total content of the components is less than 10 mass % with respect to 100 mass % of the working fluid, and is preferably 8 mass % or less, and more preferably 5 mass % or less.

The working fluid of the present invention contains: HFO-1123 that exerts less influence on global warming and is excellent in capability as the working fluid; HFO-1234ze that is excellent in efficiency as the working fluid, low in discharge temperature, and low in discharge pressure; and HFC-32 that is relatively high in GWP but is excellent in capability as the working fluid, and forms an azeotropic or pseudo-azeotropic composition with HFO-1123. The working fluid of the present invention is a working fluid having a composition made in consideration of the viewpoint of the discharge pressure in the mixture made by mixing the three components and being excellent in cycle performance as compared with the case of using them individually, and exerts less influence on the durability and global warming and has sufficient cycle performance in practical used.

<Working Fluid Composition>
The working fluid of the present invention can be normally mixed with a lubricating oil, when applied to the air-conditioner for electric vehicle, and used as a working fluid composition of the present invention. The working fluid composition of the present invention containing the working fluid of the present invention and the lubricating oil may contain publicly-known additives such as a stabilizer, a leakage detection material and so on in addition to them.

(Lubricating Oil)

As the lubricating oil, a publicly-known lubricating oil conventionally used in the working fluid composition together with the working fluid composed of halogenated hydrocarbon can be employed without any limitation. Concrete examples of the lubricating oil include an oxygen-containing synthetic oil (ester-based lubricating oil, ether-based lubricating oil and the like), a fluorine-based lubricating oil, a mineral-based lubricating oil, a hydrocarbon-based synthetic oil and the like.

Examples of the ester-based lubricating oil include a dibasic acid ester oil, a polyol ester oil, a complex ester oil, a polyol carbonate ester oil and the like.

As the dibasic acid ester oil, esters of dibasic acids having 5 to 10 carbon atoms (a glutaric acid, an adipic acid, a pimelic acid, a suberic acid, an azelaic acid, a sebacic acid and the like), with monohydric alcohols having a linear or branched alkyl group with 1 to 15 carbon atoms (methanol, ethanol, propanol, butanol, pentanol, hexanol, heptanol, octanol, nonanol, decanol, undecanol, dodecanol, tridecanol, tetradecanol, pentadecanol, and the like) are preferable. Concrete examples of the ester include ditridecyl glutarate, di(2-ethylhexyl) adipate, diisodecyl adipate, ditridecyl adipate, di(3-ethylhexyl) sebacate and the like.

As the polyol ester oil, esters of diols (ethylene glycol, 1,3-propanediol, propylene glycol, 1,4-butanediol, 1,2-butanediol, 1,5-pentanediol, neopentyl glycol, 1,7-heptanediol, 1,12-dodecanediol and the like) or polyols with 3 to 20 hydroxyl groups (trimethylolethane, trimethylolpropane, trimethylolbutane, pentaerythritol, glycerin, sorbitol, sorbitan, sorbitol-glycerine condensate and the like), with fatty acids having 6 to 20 carbon atoms (linear or branched fatty acids such as a hexanoic acid, a heptanoic acid, an octanoic acid, a nonanoic acid, a decanoic acid, an undecanoic acid, a dodecanoic acid, an eicosanoic acid, an oleic acid and the like or a so-called neo acid with a quaternary ca carbon atom) are preferable. Note that these polyol ester oils may have a free hydroxyl group.

As the polyol ester oil, esters (trimethylolpropane tripelargonate, pentaerythritol-2-ethylhexanoate, pentaerythritol tetrapelargonate and the like) of hindered alcohols (neopentyl glycol, trimethylolethane, trimethylolpropane, trimethylolbutane, pentaerythritol and the like) are preferable.

The complex ester oil is an ester of a fatty acid and a dibasic acid with a monohydric alcohol and a polyol. As the fatty acid, dibasic acid, monohydric alcohol, and polyol, the same as those described above can be used.

The polyol carbonate ester oil is an ester of a carbonic acid and a polyol. Examples of polyol include the diols similar to the above and the polyols similar to the above. Further, the polyol carbonate ester oil may be a ring-opening polymer of cyclic alkylenecarbonate.

Examples of the ether-based lubricating oil include a polyvinylether oil and a polyoxyalkylene oil.

Examples of the polyvinylether oil include the one obtained by polymerizing a vinyl ether monomer such as alkyl vinyl ether, and a copolymer obtained by copolymerizing a vinyl ether monomer and a hydrocarbon monomer having an olefinic double bond. As for the vinyl ether monomer, one kind may be used independently, or two or more kinds may be used in combination.

Examples of the hydrocarbon monomer having an olefinic double bond include ethylene, propylene, butenes, pentenes, hexenes, heptenes, octenes, diisobutylene, triisobutylene, styrene, α-methylstyrene, alkyl-substituted styrenes and the like. As for the hydrocarbon monomer having an olefinic double bond, one kind may be used independently, or two or more kinds may be used in combination.

The polyvinylether copolymer may be either a block or random copolymer. As for polyvinylether oil, one kind may be used independently, or two or more kinds may be used in combination.

Examples of the polyoxyalkylene oil include polyoxyalkylene monool, polyoxyalkylene polyol, alkyl ether of polyoxyalkylene monool or polyoxyalkylene polyol, ester of polyoxyalkylene monool or polyoxyalkylene polyol and the like.

Examples of polyoxyalkylene monool and polyoxyalkylene polyol include those obtained by a method of subjecting alkylene oxides having 2 to 4 carbon atoms (ethylene oxide, propylene oxide and the like) to ring opening addition polymerization to an initiator such as water or a hydroxyl group-containing compound in the presence of a catalyst such as an alkali hydroxide. Further, the oxyalkylene units in the polyoxyalkylene chain may be the same in one molecule or two or more kinds of oxyalkylene units may be contained. It is preferable that at least the oxypropylene unit is contained in one molecule.

Examples of the initiator used for reaction include water, monohydric alcohols such as methanol, butanol and the like, and polyhydric alcohols such as ethylene glycol, propylene glycol, pentaerythritol, glycerol and the like.

As the polyoxyalkylene oil, alkyl ether or ester of polyoxyalkylene monool or polyoxyalkylene polyol are preferable. Further, as the polyoxyalkylene polyol, polyoxyalkylene glycol is preferable. In particular, alkyl ether of polyoxyalkylene glycol having the terminal hydroxy group of the polyoxyalkylene glycol capped with an alkyl group such as a methyl group, which is called a polyglycol oil is preferable.

Examples of the fluorine-based lubricating oil include a compound made by substituting a hydrogen atom of a synthetic oil (later-described mineral oil, poly-α-olefin, alkylbenzene, alkylnaphthalene or the like) with a fluorine atom, a perfluoropolyether oil, a fluorinated silicone oil and the like.

Examples of the mineral-based lubricating oil include a paraffin-based mineral oil, a naphthene-based mineral oil and the like made by refining a lubricating oil distillate obtained by subjecting a crude oil to atmospheric distillation or vacuum distillation appropriately combined with a refining treatment (solvent deasphalting, solvent extraction, hydrogenolysis, solvent dewaxing, catalytic dewaxing, hydrogenation refining, clay treatment and the like).

Examples of the hydrocarbon-based synthetic oil include poly-α-olefin, alkylbenzene, alkylnaphthalene and the like.

As for the lubricating oil, one kind may be used independently, or two or more kinds of them may be used in combination. As the lubricating oil, one or more kinds selected from a polyolester oil, a polyvinylether oil, and a polyglycol oil are preferable in terms of compatibility with the working fluid.

The addition amount of the lubricating oil only needs to fall within a range not significantly decreasing the effects of the present invention, and is preferably 10 to 100 parts by mass and more preferably 20 to 50 parts by mass with respect to 100 parts by mass of the working fluid.

(Stabilizer)

The stabilizer is a component for improving the stability of the working fluid against heat and oxidation. As the stabilizer, a publicly-known stabilizer used for the air-conditioner for electric vehicle, for example, an oxidation resistance improver, a heat resistance improver, a metal deactivator or the like can be employed together with the working fluid conventionally composed of halogenated hydrocarbon without any limitation.

Examples of the oxidation resistance improver and the heat resistance improver include N,N'-diphenyl-phenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkylphenothiazine, 6-(t-butyl) phenol, 2,6-di-(t-butyl)phenol, 4-methyl-2,6-di-(t-butyl) phenol, 4,4'-methylenebis(2,6-di-t-butylphenol) and the like. As for the oxidation resistance improver and the heat resistance improver, one kind may be used independently, or two or more kinds may be used in combination.

Examples of the metal deactivator include imidazole, benzimidazole, 2-mercaptobenzothiazole, 2,5-dimercaptothiadiazole, salicylidine-propylenediamine, pyrazole, benzotriazole, tolutriazole, 2-methylbenzamidazole, 3,5-dimethylpyrazole, methylenebis-benzotriazole, organic acids or their esters, primary, secondary or tertiary aliphatic amine, an amine salt of an organic acid or an inorganic acid, a heterocyclic nitrogen containing compound, an amine salt of alkyl phosphate or their derivatives and the like.

The addition amount of the stabilizer only needs to fall within a range not significantly decreasing the effects of the present invention, and is preferably 5 parts by mass or less and more preferably 1 part by mass or less with respect to 100 parts by mass of the working fluid.

(Leakage Detection Material)

Examples of the leakage detection material include an ultraviolet fluorescence dye, an odor gas, an odor masking agent and the like.

Examples of the ultraviolet fluorescence dye include publicly-known ultraviolet fluorescence dyes used for the air-conditioner for electric vehicle together with the working-fluid conventionally composed of halogenated hydrocarbon, such as those disclosed in U.S. Pat. No. 4,249,412, JP-A-H10-502737, JP-A-2007-511645, JP-A-2008-500437, and JP-A-2008-531836.

Examples of the odor masking agent include publicly-known aroma chemicals used for the air-conditioner for electric vehicle together with the working fluid conventionally composed of halogenated hydrocarbon, such as those disclosed in JP-A-2008-500437 and JP-A-2008-531836.

In the case of using the leakage detection material, a solubilizing agent for improving the solubility of the leakage detection material to the working fluid may be used.

Examples of the solubilizing agent include those disclosed in JP-A-2007-511645, JP-A-2008-500437, and JP-A-2008-531836.

The addition amount of the leakage detection material only needs to fall within a range not significantly decreasing the effects of the present invention, and is preferably 2 parts by mass or less and more preferably 0.5 parts by mass or less with respect to 100 parts by mass of the working fluid.

[Application to Air-Conditioner for Electric Vehicle]

The working fluid of the present invention is applied to the air-conditioner for electric vehicle, for example, in a form of the above-described working fluid composition of the present invention including the working fluid.

As the air-conditioner for electric vehicle, an air-conditioner constituted of heat exchangers such as a condenser and an evaporator can be exemplified without any limitation. Note that when the working fluid of the present invention is used in the air-conditioner that performs cooling and heating by a heat pump, the particularly significant effects as described above are presented.

Note that when operating the air-conditioner for electric vehicle, in order to prevent occurrence of a failure due to mixture of moisture and mixture of noncondensing gas such as oxygen, it is preferable to provide a means for suppressing the mixture of them.

Moisture mixed into the air-conditioner for electric vehicle may cause problems when the air-conditioner for electric vehicle is used particularly at low temperature. For example, problems such as freezing in a capillary tube, hydrolysis of the working fluid and lubricating oil, deterioration of material due to acid component generated in a cycle, generation of contaminants and so on occur. In particular, when the lubricating oil is the polyglycol oil, the polyester oil or the like, the lubricating oil is extremely high in hygroscopicity, is likely to cause a hydrolysis reaction, and decreases in characteristics as the lubricating oil, resulting in a major cause to lose the long-term reliability of the compressor. Accordingly, to suppress the hydrolysis of the lubricating oil, it is necessary to control the moisture concentration in the air-conditioner for electric vehicle.

Examples of the method of controlling the moisture concentration in the air-conditioner include a method of using a moisture removing means such as a drying agent (silica gel, activated alumina, zeolite or the like). Bringing the drying agent into contact with a liquid working fluid is preferable in terms of dehydration efficiency. For example, it is preferable to place the drying agent at an outlet of the condenser 12 or an inlet of the evaporator 14 so as to bring the drying agent into contact with the working fluid.

As the drying agent, a zeolite-based drying agent is preferable in terms of the chemical reactivity between the drying agent and the working fluid and the hygroscopicity of the drying agent.

As the zeolite-based drying agent, a zeolite-based drying agent containing a compound expressed by the following Formula (3) as a main component is preferable in terms of being excellent in hygroscopicity in the case of using a lubricating oil higher in moisture absorption amount than the conventional mineral-based lubricating oil.

$$M_{2/n}O \cdot Al_2O_3 \cdot xSiO_2 \cdot yH_2O \qquad (3)$$

Where M is an element of Group 1 such as Na, K or the like or an element of Group 2 such as Ca or the like, n is a valence of M, x and y are values decided by a crystal structure. By changing M, the pore diameter can be adjusted.

For the selection of the drying agent, the pore diameter and the breaking strength are important. In the case of using a drying agent having a pore diameter larger than a molecular diameter of the working fluid, the working fluid is absorbed into the drying agent, and as a result, a chemical reaction occurs between the working fluid and the drying agent, thereby causing unfavorable phenomena such as generation of noncondensing gas, a decrease in strength of the drying agent, a decrease in adsorption capacity and the like.

Accordingly, it is preferable to use, as the drying agent, a zeolite-based drying agent having a small pore diameter. In particular, a sodium-potassium A type synthetic zeolite having a pore diameter of 3.5 angstrom or less is preferable. Applying the sodium-potassium A type synthetic zeolite having a pore diameter smaller than the molecular diameter of the working fluid makes it possible to selectively absorb and remove only moisture in the air-conditioner for electric vehicle without absorbing the working fluid. In other words, since the absorption of the working fluid to the drying agent is unlikely occur, thermal decomposition becomes less likely to occur, thereby making it possible to suppress deterioration of the material constituting the air-conditioner for electric vehicle and occurrence of contaminants.

The size of the zeolite-based drying agent is preferably about 0.5 to 5 mm since the zeolite-based drying agent having a too-small size causes clogging of the valve or the pipe small portion in the air-conditioner for electric vehicle, whereas the zeolite-based drying agent having a too-large size decreases the drying ability. The shape of the zeolite-based drying agent is preferably granular or cylindrical.

The zeolite-based drying agent can be made into an arbitrary shape by solidifying powdery zeolite with a binder (bentonite or the like). As long as the zeolite-based drying agent is used as a main body, another drying agent (silica gel, activated alumina or the like) may be used together. The use ratio of the zeolite-based drying agent to the working fluid is not particularly limited.

Further, the noncondensing gas, when entering the inside of the air-conditioner for electric vehicle, has adverse effects such as failure of thermal transfer in the condenser and the evaporator and an increase in working pressure, and therefore the mixture of the noncondensing gas needs to be suppressed as much as possible. In particular, oxygen being one noncondensing gas reacts with the working fluid and the lubricating oil to promote decomposition.

The concentration of the noncondensing gas is preferably 1.5 volume % or less and particularly preferably 0.5 volume % or less by volume percent with respect to the working fluid in a gas phase part of the working fluid.

EXAMPLES

Hereinafter, the present invention will be described in detail using examples, but the present invention is not limited by the following examples. Examples 1 to 39 are examples and Examples 40 to 46 are comparative examples. Example 47 is an example of HFO-1234yf used for relative evaluation in the following examples and comparative examples, and is a reference example. Note that the refrigeration cycle performance is used in the following evaluation, and the same also applies to the cycle performance during heating time.

Examples 1 to 46

In Example 1 to Example 39, working media each made by mixing HFO-1123, HFC-32, and HFO-1234ze(E) at percentages listed in Table 2 were fabricated and their refrigeration cycle performance (refrigerating capacity Q and coefficient of performance COP), discharge gas temperature, discharge gas pressure, and self-decomposition were measured by the following methods. Example 40, Example 45, Example 46 are working media each having a single composition of HFO-1123, HFC-32, and HFO-1234ze(E) respectively, and Example 41 to Example 44 are working media each made by mixing two kinds of HFO-1123 and HFC-32 at percentages listed in Table 3, and their refrigeration cycle performance (refrigerating capacity Q and coefficient of performance COP), discharge gas temperature, discharge gas pressure, and self-decomposition were measured similarly to the above.

[Measurement of Refrigeration Cycle Performance, Discharge Temperature, and Discharge Pressure]
Measurement of the refrigeration cycle performance (refrigerating capacity and coefficient of performance), discharge temperature, and discharge pressure was performed for the case of executing the thermal cycle illustrated in FIG. 3, namely, the adiabatic compression by the compressor 11 in the AB process, the isobaric cooling by the condenser 12 in the BC process, the isenthalpic expansion by the expansion valve 13 in the CD process, and the isobaric heating by the evaporator 14 in the DA process, by applying the working media to the refrigeration cycle system 10 illustrated in FIG. 2.

The measurement was executed under the measurement conditions that the evaporation temperature of the working fluid in the evaporator 14 was 0° C. (however, an average temperature of an evaporation start temperature and an evaporation completion temperature in the case of a zeotropic mixture), the condensation completion temperature of the working fluid in the condenser 12 was 40° C. (however, an average temperature of a condensation start temperature and a condensation completion temperature in the case of a zeotropic mixture), the degree of supercooling (SC) of the working fluid in the condenser 12 was 5° C., and the degree of superheating (SH) of the working fluid in the evaporator 14 was 5° C. Besides, it was assumed that there was no loss due to device efficiency and no pressure loss in the pipes and heat exchangers.

The refrigerating capacity and the coefficient of performance were obtained from the following Expressions (11), (12) by using enthalpies h in respective states of A (after evaporation, at high temperature and low pressure), B (after compression, at high temperature and high pressure), C (after condensation, at low temperature and high pressure), and D (after expansion, at low temperature and low pressure) of the working fluid.

The thermodynamic property required for calculation of the refrigeration cycle performance was calculated based on a generalized state equation (Soave-Reclich-Kwong equation) based on a principle of corresponding states, and on thermodynamics relational expressions. When the characteristic value was not able to be obtained, calculation was performed using an estimation method based on an atomic group contribution method.

The refrigerating capacity and the coefficient of performance in each example were obtained as relative ratios (relative refrigerating capacity illustrated as "RQ" in Table 2 and Table 3 and relative coefficient of performance illustrated as "RCOP" in Table 2 and Table 3) when the refrigerating capacity and the coefficient of performance of HFO-1234yf similarly measured as described above in later-descried Example 47 were each 1.000. The discharge temperature difference illustrated as "TΔ" in Table 2 and Table 3 was obtained as a value made by subtracting the discharge temperature of HFO-1234yf in Example 47 from the discharge temperature in each example. The discharge pressure ratio illustrated as "Pressure Ratio" in Table 2 and Table 3 was obtained as a value of the ratio of the discharge pressure in each example with respect to the discharge pressure of HFO-1234yf in Example 47.

[Evaluation of Self-Decomposition]
The evaluation of self-decomposition was executed using a facility compliant with the A method recommended as a facility for measuring a combustion range of gas made by mixing gas containing halogen in an individual notification in High Pressure Gas Safety Act.

To be more precise, mixed media made by mixing HFO-1123, HFC-32, and HFO-1234ze(E) at percentages in Examples 1 to 46 were each enclosed, to a predetermined pressure, within a spherical pressure tight case having an internal volume of 650 cm$^3$ controlled to a predetermined temperature from the outside, and then an energy of about 30

J was applied thereto by fusing a platinum wire installed therein. The measurement was performed under the conditions of 300° C. and 10 MPa. The temperature and pressure changes in the pressure tight case occurring after the application were measured, and thereby presence or absence of self-decomposition was confirmed. When pressure rise and temperature rise were recognized, presence of self-decomposition reaction was determined.

TABLE 2

| | Working fluid composition [mass %] | | | Cycle performance (relative to HFO-1234yf) | | Load on apparatus (relative to HFO-1234yf) | | Self-decomposition | GWP |
|---|---|---|---|---|---|---|---|---|---|
| | HFO-1123 | HFO-1234ze (E) | HFC-32 | RCOP | RQ | Pressure Ratio | TΔ[° C.] | | |
| Ex.1 | 10 | 10 | 80 | 0.961 | 2.520 | 2.4 | 36.8 | Absence | 541 |
| Ex.2 | 20 | 10 | 70 | 0.953 | 2.556 | 2.5 | 35.6 | Absence | 473 |
| Ex.3 | 30 | 10 | 60 | 0.944 | 2.585 | 2.5 | 34.2 | Absence | 406 |
| Ex.4 | 40 | 10 | 50 | 0.934 | 2.605 | 2.6 | 32.8 | Absence | 338 |
| Ex.5 | 50 | 10 | 40 | 0.924 | 2.615 | 2.6 | 31.3 | Presence | 271 |
| Ex.6 | 60 | 10 | 30 | 0.915 | 2.613 | 2.7 | 29.7 | Presence | 203 |
| Ex.7 | 70 | 10 | 20 | 0.907 | 2.597 | 2.7 | 28.1 | Presence | 136 |
| Ex.8 | 80 | 10 | 10 | 0.900 | 2.565 | 2.7 | 26.5 | Presence | 68 |
| Ex.9 | 10 | 20 | 70 | 0.967 | 2.349 | 2.2 | 34.2 | Absence | 474 |
| Ex.10 | 20 | 20 | 60 | 0.959 | 2.376 | 2.3 | 33.1 | Absence | 406 |
| Ex.11 | 30 | 20 | 50 | 0.944 | 2.585 | 2.5 | 34.2 | Absence | 339 |
| Ex.12 | 40 | 20 | 40 | 0.941 | 2.402 | 2.4 | 30.5 | Absence | 271 |
| Ex.13 | 50 | 20 | 30 | 0.932 | 2.400 | 2.4 | 29.1 | Presence | 204 |
| Ex.14 | 60 | 20 | 20 | 0.924 | 2.384 | 2.4 | 27.5 | Presence | 136 |
| Ex.15 | 70 | 20 | 10 | 0.917 | 2.353 | 2.4 | 25.8 | Presence | 69 |
| Ex.16 | 10 | 30 | 60 | 0.975 | 2.176 | 2.1 | 31.5 | Absence | 407 |
| Ex.17 | 20 | 30 | 50 | 0.959 | 2.376 | 2.3 | 33.1 | Absence | 339 |
| Ex.18 | 30 | 30 | 40 | 0.959 | 2.202 | 2.2 | 29.2 | Absence | 272 |
| Ex.19 | 40 | 30 | 30 | 0.952 | 2.199 | 2.2 | 27.9 | Absence | 204 |
| Ex.20 | 50 | 30 | 20 | 0.944 | 2.184 | 2.2 | 26.5 | Absence | 137 |
| Ex.21 | 60 | 30 | 10 | 0.938 | 2.154 | 2.2 | 24.8 | Presence | 69 |
| Ex.22 | 10 | 40 | 50 | 0.975 | 2.176 | 2.1 | 31.5 | Absence | 340 |
| Ex.23 | 20 | 40 | 40 | 0.979 | 2.010 | 1.9 | 27.5 | Absence | 272 |
| Ex.24 | 30 | 40 | 30 | 0.972 | 2.008 | 2.0 | 26.3 | Absence | 205 |
| Ex.25 | 40 | 40 | 20 | 0.966 | 1.994 | 2.0 | 25.0 | Absence | 138 |
| Ex.26 | 50 | 40 | 10 | 0.961 | 1.965 | 2.0 | 23.4 | Absence | 70 |
| Ex.27 | 10 | 50 | 40 | 0.997 | 1.822 | 1.7 | 25.4 | Absence | 273 |
| Ex.28 | 20 | 50 | 30 | 0.992 | 1.822 | 1.8 | 24.3 | Absence | 206 |
| Ex.29 | 30 | 50 | 20 | 0.988 | 1.809 | 1.8 | 23.0 | Absence | 138 |
| Ex.30 | 40 | 50 | 10 | 0.984 | 1.781 | 1.8 | 21.5 | Absence | 71 |
| Ex.31 | 10 | 60 | 30 | 1.010 | 1.636 | 1.6 | 21.8 | Absence | 206 |
| Ex.32 | 20 | 60 | 20 | 1.006 | 1.624 | 1.6 | 20.6 | Absence | 139 |
| Ex.33 | 30 | 60 | 10 | 1.003 | 1.598 | 1.6 | 19.2 | Absence | 71 |
| Ex.34 | 10 | 70 | 20 | 1.021 | 1.437 | 1.4 | 17.7 | Absence | 139 |
| Ex.35 | 20 | 70 | 10 | 1.018 | 1.411 | 1.4 | 16.3 | Absence | 72 |
| Ex.36 | 10 | 80 | 10 | 1.027 | 1.220 | 1.2 | 12.7 | Absence | 72 |
| Ex.37 | 2 | 90 | 8 | 1.032 | 1.020 | 1.0 | 7.9 | Absence | 59 |
| Ex.38 | 4 | 90 | 6 | 1.030 | 1.012 | 1.0 | 7.5 | Absence | 46 |
| Ex.39 | 6 | 90 | 4 | 1.028 | 1.002 | 1.0 | 7.2 | Absence | 32 |

TABLE 3

| | Working fluid composition [mass %] | | | Cycle performance (relative to HFO-1234yf) | | Load on apparatus (relative to HFO-1234yf) | | Self-decomposition | GWP |
|---|---|---|---|---|---|---|---|---|---|
| | HFO-1123 | HFO-1234ze (E) | HFC-32 | RCOP | RQ | Pressure Ratio | TΔ[° C.] | | |
| Ex.40 | 100 | 0 | 0 | 0.881 | 2.718 | 2.9 | 25.6 | Presence | 0.3 |
| Ex.41 | 80 | 0 | 20 | 0.893 | 2.819 | 2.9 | 28.6 | Presence | 135 |
| Ex.42 | 60 | 0 | 40 | 0.911 | 2.841 | 2.9 | 31.7 | Presence | 270 |
| Ex.43 | 40 | 0 | 60 | 0.930 | 2.804 | 2.8 | 35.0 | Absence | 405 |
| Ex.44 | 20 | 0 | 80 | 0.948 | 2.730 | 2.6 | 38.0 | Absence | 540 |
| Ex.45 | 0 | 0 | 100 | 0.964 | 2.630 | 2.5 | 40.7 | Absence | 675 |
| Ex.46 | 0 | 100 | 0 | 1.036 | 0.796 | 0.8 | 0.4 | Absence | 6 |

As is found from Table 2 and Table 3, the relative coefficient of performance increases with an increase in content of HFO-1234ze, whereas the relative refrigerating capacity decreases with an increase in content of HFO-1234ze. As described above, the relation between the relative coefficient of performance and the content of HFO-1234ze and the relation between the relative refrigerating capacity and the content of HFO-1234ze in the working fluid of the present invention are contrary to each other, and though both of them do not always satisfy 1.000 or more in all the composition range, the working media in Example 1 to Example 39 being examples of the present invention are excellent in relative refrigerating capacity, equivalent in relative coefficient of performance, and good in balance between the discharge pressure and the discharge temperature as compared with comparative examples and HFO-1234yf. Further, the working media are excellent in relative refrigerating capacity as compared with HFO-1234yf, and therefore have sufficient performance also in the heating time in addition to the cooling time.

Having sufficient performance also in the heating time in addition to the cooling time here means that the relative refrigerating capacity is at a level higher than 1.01.

Example 47

For HFO-1234yf being the object for relative comparison of Examples 1 to 46, the discharge temperature, discharge pressure, and refrigeration cycle performance (refrigerating capacity Q and coefficient of performance COP) were measured by the same methods as those in the above. Table 2 and Table 3 list the relative values based on the evaluation result of HFO-1234yf.

Since HFO-1234yf is the conventionally used working fluid, this was used as a reference of the cycle performance in the examples, so that a level exceeding by a certain value or more as described above was evaluated to be sufficient cycle performance in practical use also in the heating time as the air-conditioner for electric vehicle.

From the above, the air-conditioner working fluid for electric vehicle of the present invention has sufficient cycle performance in practical use. Further, without greatly changing the specifications of the air-conditioner device to which a conventional working fluid high in GWP is applied, replacement of the working fluid is made possible.

The working fluid of the present invention is useful as a working fluid used for the air-conditioner for electric vehicle.

What is claimed is:

1. An air-conditioner working fluid for electric vehicle, the working fluid comprising
   trifluoroethylene, difluoromethane, 2,3,3,3-tetrafluoropropene, and 1,3,3,3-tetrafluoropropene,
   wherein
   a percentage of a total amount of trifluoroethylene, difluoromethane and 1,3,3,3-tetrafluoropropene with respect to a total amount of the working fluid is more than 90 mass % and less than 100 mass %, and
   a percentage of 1,3,3,3-tetrafluoropropene with respect to the total amount of trifluoroethylene, difluoromethane and 1,3,3,3-tetrafluoropropene is 40 mass % or more and 90 mass % or less.

2. The air-conditioner working fluid for electric vehicle according to claim 1, wherein a percentage of trifluoroethylene is more than 0 mass % and 50 mass % or less, and a percentage of difluoromethane is more than 0 mass % and 40 mass % or less, with respect to the total amount of trifluoroethylene, difluoromethane and 1,3,3,3-tetrafluoropropene.

3. The air-conditioner working fluid for electric vehicle according to claim 1, wherein a percentage of trifluoroethylene is more than 0 mass % and 20 mass % or less, a percentage of difluoromethane is more than 0 mass % and 20 mass % or less, and the percentage of 1,3,3,3-tetrafluoropropene is 65 mass % or more and 90 mass % or less, with respect to the total amount of trifluoroethylene, difluoromethane and 1,3,3,3-tetrafluoropropene.

4. The air-conditioner working fluid for electric vehicle according to claim 1, wherein the working fluid has a global warming potential (100 years) in the Intergovernmental Panel on Climate Change (IPCC) Fourth Assessment Report of less than 400.

5. The air-conditioner working fluid for electric vehicle according to claim 4, wherein the working fluid has a global warming potential of less than 300.

6. The air-conditioner working fluid for electric vehicle according to claim 4, wherein the working fluid has a global warming potential of less than 200.

7. The air-conditioner working fluid for electric vehicle according to claim 1, wherein the 1,3,3,3-tetrafluoropropene contains 60 mass % or more of trans-1,3,3,3-tetrafluoropropene.

8. The air-conditioner working fluid for electric vehicle according to claim 1, the working fluid consisting of
   trifluoroethylene, difluoromethane, 1,3,3,3-tetrafluoropropene, and 2,3,3,3-tetrafluoropropene.

9. The air-conditioner working fluid for electric vehicle according to claim 1, wherein the air-conditioner for electric vehicle performs cooling and heating by a heat pump.

10. An air-conditioner working fluid composition for electric vehicle, the working fluid composition comprising
    the air-conditioner working fluid for electric vehicle according to claim 1 and
    a lubricating oil.

* * * * *